United States Patent

Struck et al.

[11] 4,392,824
[45] Jul. 12, 1983

[54] SYSTEM FOR IMPROVING THE FLOW OF GASES TO A COMBUSTION CHAMBER OF A COKE OVEN OR THE LIKE

[75] Inventors: Carl-Heinz Struck, Bochum; Ralf Schumacher, Hagen, both of Fed. Rep. of Germany

[73] Assignee: Dr. C. Otto & Comp. G.m.b.H., Bochum, Fed. Rep. of Germany

[21] Appl. No.: 306,152

[22] Filed: Sep. 28, 1981

[30] Foreign Application Priority Data

Oct. 8, 1980 [DE] Fed. Rep. of Germany ....... 3037950

[51] Int. Cl.³ .......................... F27D 17/00; C10B 1/06
[52] U.S. Cl. .................................. 432/180; 202/141; 202/142; 432/181
[58] Field of Search ....................... 432/180, 181, 182; 202/141, 142, 143, 144, 146

[56] References Cited

U.S. PATENT DOCUMENTS 1,606,140 11/1926 Becker ................................. 202/144
1,663,847 3/1928 Koppers .............................. 202/144
4,004,983 1/1977 Pries ................................... 202/142

Primary Examiner—John J. Camby

Attorney, Agent, or Firm—Thomas H. Murray; Clifford A. Poff

[57] ABSTRACT

A heating flue for a coke oven includes a wedge-shaped refractory brick having at least one oblique surface and vertical cylindrical bores when the brick is inserted into the vertical portion of a duct at the bottom of the heating flue. This part of the duct has an increased diameter to support the brick so that the vertical sides abut the inner duct walls and the bottom oblique surface extends toward the mouth of an obliquely-rising portion of the duct. The sum of the cross-sectional areas of the cylindrical bores in the brick is from 0.75 to 1.5 times the flow cross section of the obliquely-rising duct portion. The cross-sectional area of the top of a wedge-shaped brick which is coplanar with the flue base is in a range of between 20 and 200 with the cross section of the cylindrical bore in the brick. The diameter of the bore is between 10 and 60 millimeters. A ratio of 0.3 to 1.5 is formed between an acute angle between the oblique bottom surface and the horizontal and an angle between the obliquely-rising duct portion and the horizontal. The top surface of the brick may also be oblique and parallel with the bottom surface whereby the brick has the shape of a rhomboid.

14 Claims, 7 Drawing Figures

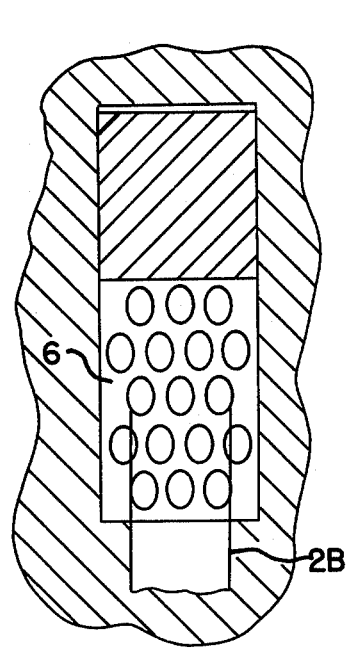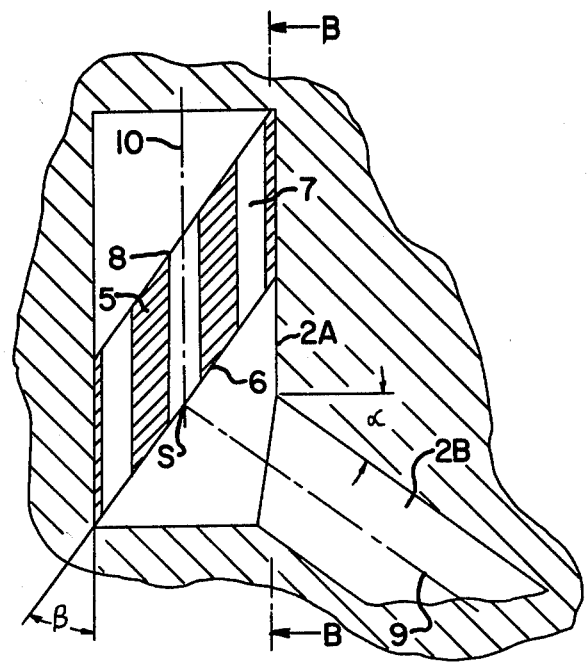
FIG. 3a  FIG. 3b
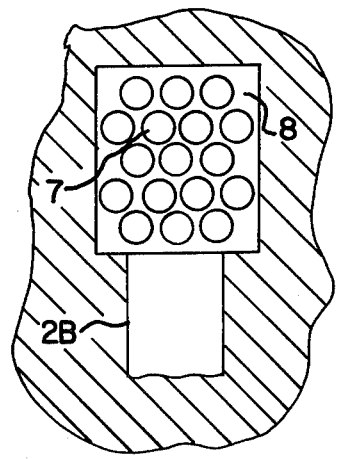
FIG. 3c

SYSTEM FOR IMPROVING THE FLOW OF GASES TO A COMBUSTION CHAMBER OF A COKE OVEN OR THE LIKE

BACKGROUND OF THE INVENTION

This invention relates to a system for improving the flow characteristics of gases fed from ducts into a combustion chamber of an industrial gas-fired system, particularly a coke oven, which includes regenerative or recuperative recovery of heat from waste gases of the combustion process. More particularly, the present invention relates to such a system for conducting heated gases into heating flues from ducts communicating with the outlet of a heat exchanger; such gases comprising air when rich gas is used for the combustion process or air and lean gas when lean gas is used for the combustion process.

An industrial gas-fired system using regenerative or recuperative recovery of heat from waste gases, particularly when rich gas is used to fire the system, is subject to constructional constraints due to the physical arrangement of the ducts required to convey the preheated combustion media from the regenerator or recuperator outlets to the combustion chambers. Because of these constraints, it is difficult to obtain uniform combustion with a uniform elongated flame. For example, the ducts in coke oven batteries are at a relatively acute angle to the horizontal because of structural requirements in the arrangement of regenerator cells depending, of course, on the heating system. The ducts terminate with a relatively short vertical duct portion leading to the heating flue. Usually, the length of the vertical duct portion is insufficient to obtain a uniform flow of gases in the cross section of the gas stream. Moreover, the length of the vertical duct portion is insufficient to obtain guiding for the gas stream such that the stream is vertical when entering the flue. Indeed, tests on models have shown that a stream of preheated combustion air drifts to a relatively considerable extent from the vertical when it enters the base of the heating flue. This results in a strong turbulence in the lower part of the heating flue which is intensified by a horizontal velocity component in the gas stream because of a sudden increase to the diameter of the stream upon entering the heating flue. An intensive spontaneous mixing of the combustion gas and the air occurs which brings about an excessive local flame temperature. In many industrial gas-fired systems, such an excessive flame temperature, even if it is locally limited, increases the formation of $NO_x$. Tests on the flow models have also shown that the drift of the flowing combustion air in the gas stream continues to higher regions of the flues, thus preventing a uniform vertical temperature distribution.

SUMMARY OF THE INVENTION

It is an object of the present invention to avoid the aforementioned disadvantages and equalize the flow of gaseous media supplied from regenerators when or before the media enter a flue or combustion chamber and to cause the media to flow vertically; thereby obtaining a homogeneous gas flow and a uniform total flow of all the gaseous reactants entering the combustion chamber while maintaining the conventional physical construction for the combustion system and substantially avoiding pressure losses.

According to the present invention, a system for improving the flow of combustion media in ducts between regenerators or recuperators and a combustion chamber includes a wedge-shaped refractory brick having at least one oblique surface and formed with vertical bores that are preferably cylindrical for support in a vertical portion of each duct, such vertical portion of the duct having a suitably increased diameter extending to the base of the flue, the brick having a rectangular cross section with vertical sides abutting the inner walls of the duct and a bottom oblique surface extending toward the mouth of an obliquely-rising portion of the duct, the sum of the cross-sectional areas of the cylindrical bores in the brick is in the range of 0.75 to 1.5 times, preferably from 0.9 to 1.15 times the flow cross section of the obliquely-rising duct portion.

These features and advantages as well as other characteristics of the system of the present invention will be more fully understood when the following description is read in light of the accompanying drawings, in which:

FIG. 3a is a sectional view taken along line B—B of FIG. 3b;

FIG. 3b is an elevational view, in section, through a second embodiment of a brick forming part of the system of the present invention; and FIG. 3c is plan view of the second embodiment of the brick shown in FIG. 3b.

Figure 1:
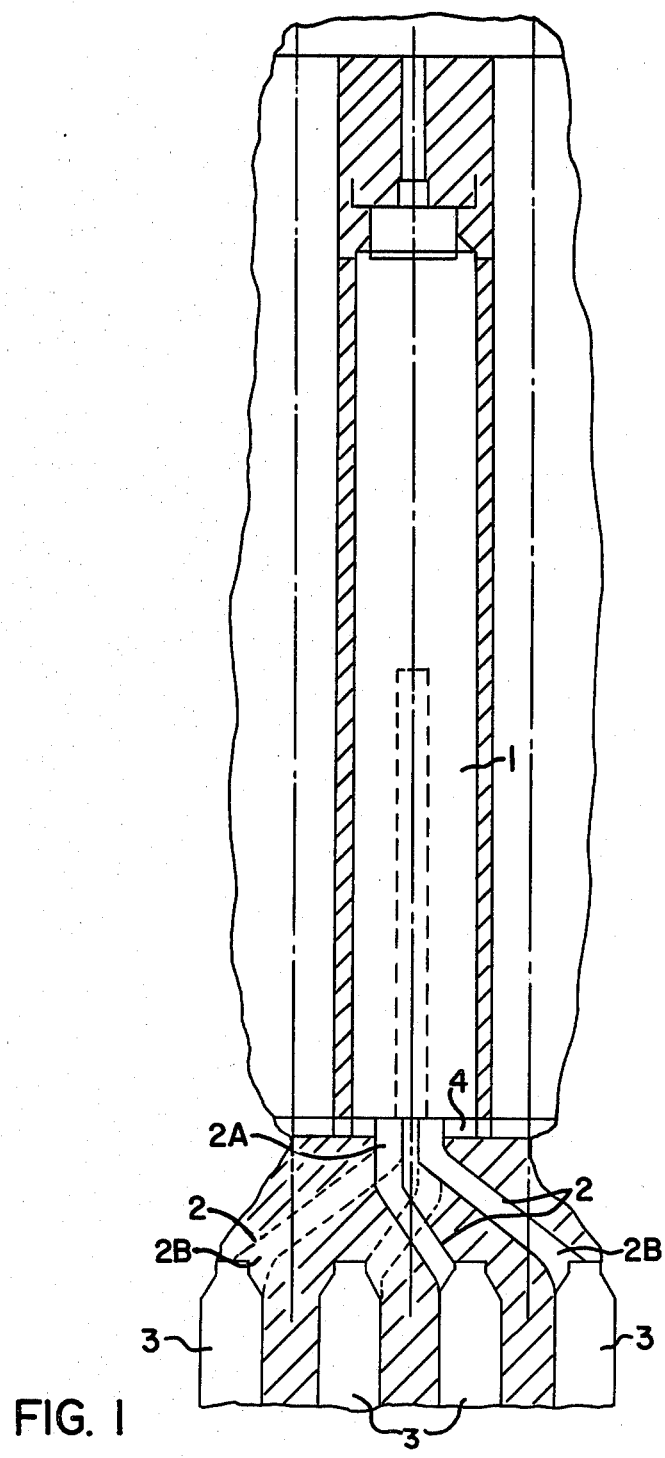
FIG. 1 is a longitudinal view, in section, through a heating flue between horizontal coke oven chambers and illustrating ducts at the base of the heating flue extending to regenerators underneath the flue.

In FIG. 1, there is illustrated a heating flue 1 forming one of a plurality of such flues extending in side-by-side relation for heating coke oven chambers at opposite sides thereof. The heating flue has a base 4 in which ducts 2 enter and connect the individual flues to regenerators 3 disposed beneath the flues. The ducts 2 comprise, in a conventional manner, an obliquely-rising portion 2b and a vertical portion 2a which extends through the regenerator cover and opens out of a wall at the base of the heating flue.

Figure 2A:
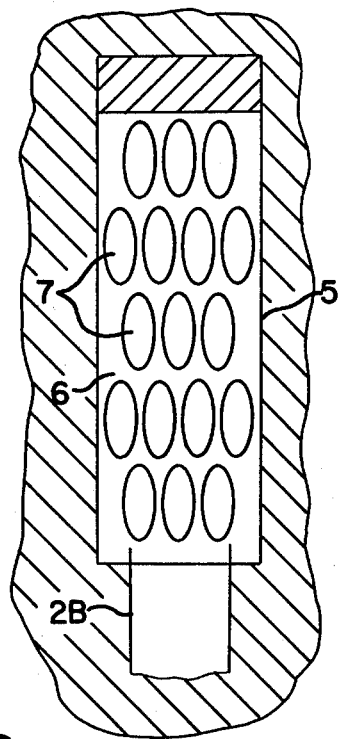
FIG. 2a is a sectional view taken along line A—A of FIG. 2b.
Figure 2B:
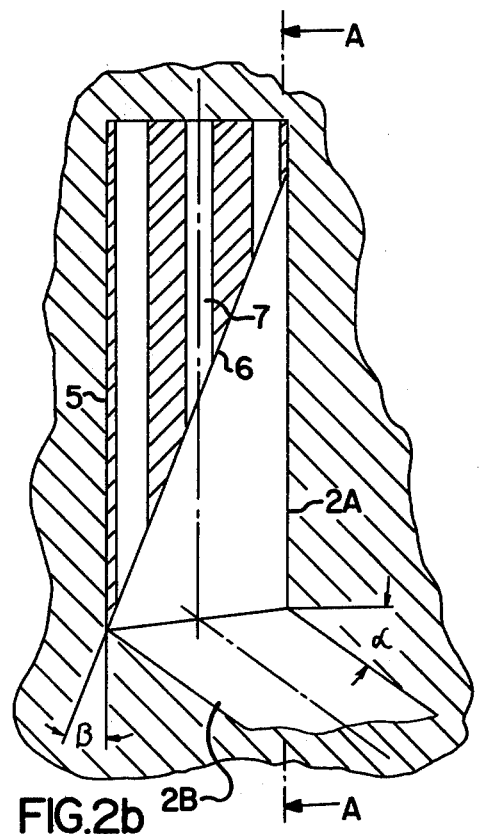
FIG. 2b is a longitudinal section through a wedge-shaped brick forming part of the system of the present invention.

According to the present invention, a system to improve the flow of gaseous media in ducts 2 provides that the vertical portion 2a of each duct is formed with an increased diameter and a wedge-shaped brick made of suitable refractory material is inserted into the vertical portion 2a. In the first embodiment of the present invention shown in FIGS. 2a–2c, the brick is wedge shaped with an oblique bottom surface 6 and a plurality of vertical bores 7 of a cylindrical configuration. The brick has a rectangular cross section. The vertical sides of the wedge-shaped brick abut the inner walls of the duct. The oblique bottom surface 6 extends toward the mouth or opening of the obliquely-rising duct portion 2b. As shown in FIG. 2b, the tip of the wedge-shaped brick is situated at the place where the obliquely-rising portion 2b merges into the vertical duct portion 2a.

In accordance with the preferred form of the present invention, the sum of the cross-sectional areas of the individual cylindrical bores 7 is within the range of 0.75 to 1.5 times the cross-sectional flow area of the obliquely-rising duct portion 2b. Preferably, the ratio is within the range of 0.9 to 1.15. The ratio between (a) the cross-sectional area of the top of the wedge-shaped brick near the regenerator cover or where it enters the base of the flue to (b) the cross-sectional area of an individual cylindrical bore 7 is within the range of 20 to 200, preferably in the range of 30 to 60. The diameter of each cylindrical bore 7 is in the range of between 10 and 60 millimeters, preferably between 20 and 50 millimeters.

A further characteristic of the system of the present invention provides that there is a ratio of between 0.3 to 1.5, preferably 0.4 to 0.7 between the acute angle $\beta$ (FIG. 2b) between the oblique surface 6 and the vertical and the angle $\alpha$ between the obliquely-rising duct portion 2b and the horizontal.

FIGS. 3a–3c illustrate a second embodiment of a brick forming part of the system according to the present invention. The second embodiment not only provides that the brick has an oblique bottom surface 6 opposite the mouth of the obliquely-rising duct portion 2b, but also the top surface 8 is oblique. Surface 8 is parallel to surface 6. The top end of the oblique surface 6 ends at a short distance below the inlet into the heating flue or combustion chamber. As shown in FIG. 3b, the brick has the shape of a rhomboid. The brick is installed so that a prolongation of the central axis 9 of the obliquely-rising duct portion 2b is at right angles to the oblique bottom surface 6. The brick is further arranged so that central axis 9 extends to a point of intersection S lying on the central axis 10 of the vertical duct portion 2a (FIG. 3b).

Figure 2C:
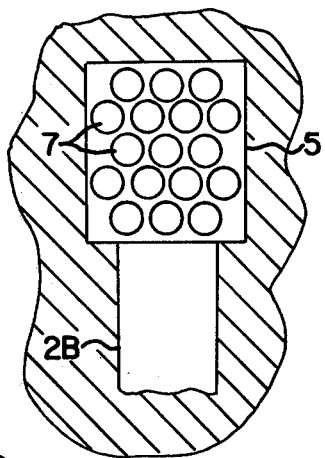
FIG. 2c is a plan view of the brick shown in FIG. 2b.

In the embodiment of the invention shown in FIGS. 3a and 3b, the ratio of the cross-sectional area of the top of the wedge-shaped brick near the regenerator cover to the cross section of an individual cylindrical bore as well as the diameter of the cylindrical bores are all subject to the same condition as described hereinabove in regard to the embodiment of the invention shown in FIGS. 2a–2c with the exception that the cross-sectional area of the top of the wedge-shaped brick is replaced by the projection to the horizontal plane as shown in FIG. 2c.

In the embodiment of FIGS. 3a and 3b, the ratio of angle $\beta$ to angle $\alpha$ is within the range of 0.5 to 1.5, preferably 0.8 to 1.2. The assembly surface of a brick adjacent the side wall of the vertical duct portion 2a should have a height L between 5 and 10 times the diameter of a vertical cylindrical bore 7.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. An industrial gas-fired system such as a coke oven, said system including a heating flue and ducts having a vertical portion and an obliquely-rising duct portion for conducting a flow of combustion gases into said heating flue, recuperative waste-heat recovery means receiving waste gases for preheating said combustion gases which comprise air when heating by combustion of rich gas and comprise air and lean gas when heating by combustion of lean gas, said combustion gases being introduced through said ducts from outlets of said waste-heat recovery means into a heating flue, said system including the combination therewith of wedge-shaped refractory bricks each having at least one oblique surface, each brick being supported within a vertical portion of a duct and having vertical bores, the vertical portion of each duct having an increased diameter and extending to the base of the flue, each brick having a rectangular cross section with vertical sides abutting the inner walls of the duct so that the said oblique surface extends at the bottom of the brick toward the mouth of the obliquely-rising duct portion, the sum of the cross-sectional areas of said cylindrical bores being within the range of 0.75 to 1.5 times the cross section of the gas-flow portion of the obliquely-rising duct portion.

2. The system according to claim 1 wherein said sum of the cross-sectional areas of the cylindrical bores is in the range of between 0.9 and 1.15 times the cross-sectional duct area of the obliquely-rising duct portion.

3. The system according to claim 1 wherein each of said bricks has a top which is coplanar with the flue base and defines a ratio of its cross-sectional area to the cross section of one of said bores within the range of 20 to 200.

4. The system according to claim 3 wherein said ratio is between 30 and 60.

5. The system according to claim 1 wherein said bores are cylindrical.

6. The system according to claim 5 wherein said diameter of said cylindrical bores is between 10 and 60 millimeters.

7. The system according to claim 5 wherein the diameter of said cylindrical bores is between 20 and 50 millimeters.

8. The system according to claim 1 further defined by a ratio of 0.3 to 1.5 between an acute angle $\beta$ formed by the said oblique surface and the horizontal and an angle $\alpha$ formed between the obliquely-rising duct portion and the horizontal.

9. The system according to claim 8 wherein said ratio is between 0.4 and 0.7.

10. The system according to claim 1 wherein said bricks each having the shape of a rhomboid and further including a bottom surface extending to the entrance of an obliquely-rising duct portion in the base of said flue, said brick having a top surface extending to a place where said duct opens into the flue with said top surface being oblique and parallel to the bottom surface of said brick, the top end of the oblique bottom surface extending a short distance below the inlet into the flue.

11. The system according to claim 10 wherein said obliquely-rising duct portion has a central axis forming an acute angle to said oblique bottom surface of the brick, said central axis extending to a point of intersection lying on the central axis of a vertical duct portion.

12. The system according to claim 5 or 6 wherein said brick includes a mounting surface adjacent the side wall of the vertical duct portion with a height of between 5 and 10 times the diameter of one of said vertical bores.

13. The system according to claim 10 wherein an acute angle $\beta$ between said oblique bottom surface and the vertical and an angle $\alpha$ between the obliquely-rising portion of the duct and the horizontal are in a ratio of between 0.5 to 1.5.

14. The system according to claim 13 wherein said ratio of $\beta$ to $\alpha$ is in the range of between 0.8 to 1.2.

* * * * *